United States Patent [19]

Ookawa

[11] Patent Number: 4,559,916
[45] Date of Patent: Dec. 24, 1985

[54] IGNITION APPARATUS FOR INTERNAL COMBUSTION ENGINE

[75] Inventor: Kiyoshi Ookawa, Himeji, Japan

[73] Assignee: Mitsubishi Denki Kabushiki Kaisha, Tokyo, Japan

[21] Appl. No.: 491,955

[22] PCT Filed: Aug. 26, 1982

[86] PCT No.: PCT/JP82/00341
§ 371 Date: Apr. 14, 1983
§ 102(e) Date: Apr. 14, 1983

[87] PCT Pub. No.: WO83/00902
PCT Pub. Date: Mar. 17, 1983

[30] Foreign Application Priority Data

Aug. 28, 1981 [JP] Japan ............... 56-136460
Sep. 16, 1981 [JP] Japan ............... 56-147529
Sep. 16, 1981 [JP] Japan ............... 56-147536

[51] Int. Cl.$^4$ ............................................. F02P 5/04
[52] U.S. Cl. ................................................ 123/418
[58] Field of Search ................................... 123/418

[56] References Cited

U.S. PATENT DOCUMENTS

| 3,867,916 | 2/1975 | Bigalke | 123/418 |
| 3,874,351 | 4/1975 | Asler | 123/418 |
| 3,916,855 | 11/1975 | Fauser | 123/418 |
| 4,079,709 | 3/1978 | Schuette | 123/418 |
| 4,100,895 | 7/1978 | Hattori | 123/418 |
| 4,104,997 | 8/1978 | Padgitt | 123/418 |
| 4,201,163 | 5/1980 | Hattori | 123/418 |
| 4,208,992 | 6/1980 | Polo | 123/418 |

FOREIGN PATENT DOCUMENTS 1458731 12/1976 United Kingdom ............... 123/418

Primary Examiner—Ronald B. Cox
Attorney, Agent, or Firm—Wenderoth, Lind & Ponack

[57] ABSTRACT

An ignition apparatus for an internal combustion engine causes the desired ignition advance characteristic of the engine by controlling an ignition advance in accordance with the status of the engine, for example, a temperature or a vacuum in a manifold, in addition to the controlling the ignition advance in accordance with the rotational speed of the engine.

3 Claims, 13 Drawing Figures

IGNITION APPARATUS FOR INTERNAL COMBUSTION ENGINE

BACKGROUND OF THE INVENTION

1. Field of the Invention

This invention relates particularly to an ignition apparatus based on semiconductors for determining an angular advance of an ignition position by an electronic circuit.

2. Description of the Prior Art

FIG. 1 is a circuit diagram illustrating a conventional ignition apparatus of the type referred to. As shown in FIG. 1, a magnetic rotor 1 is rotated in synchronism with an engine (not shown) and has a protrusion on one portion thereof; a pulser 2 which is composed of a magneto generator for detecting an ignition position of a maximum angular advance is provided; a similar pulser 3 is also provided for detecting an ignition position of a minimum angular advance.

A signal from the pulser 2 is arranged to be applied, as a setting signal, to a setting input S of RS FLIP-FLOP circuit 4 (which is called hereinafter a FF) and a signal from the pulser 3 is arranged to be applied, as a resetting signal, to a resetting input R of the FF 4.

An output Q of this FF 4 is connected through a resistance 5 to an inverting input of an operational amplifier 6 (which is called hereinafter an op-amp) and is also connected to an emitter of a transistor 9. An output end $\bar{Q}$ of the FF 4 is connected to a base of the transistor 9 through a pulse circuit 8.

This pulse circuit 8 may be a differentiation circuit for generating a pulse with a sufficiently short pulse width during the time that an output signal developed at the output $\bar{Q}$ of the FF 4 rises from an "L" level to an "H" level.

A non-inverting input of said op-amp 6 is supplied with a second voltage $V_2$ and an output of this op-amp 6 is connected to a collector of the transistor 9 and is also connected to one input of a comparator 10. The other input of this comparator 10 is supplied with a first voltage $V_1$. An integrating capacitor 7 is connected between the emitter and collector of the transistor 9.

The following description will be made by using timing charts of FIG. 2 (DIAGRAMS A–G) with respect to the operation of the ignition apparatus of FIG. 1. The waveforms shown by FIG. 2 (DIAGRAMS A–G) expresses signals on those portions shown by (a) to (g) in FIG. 1. A signal shown in FIG. 2(a) is outputted from the pulser 2 and on the other hand a signal shown in FIG. 2(b) is outputted from the pulser 3. Accordingly an output from the output Q of the FF 4 and the output from the output $\bar{Q}$ are substantially as shown in FIGS. 2(c) and (d) respectively.

First the FF 4 is put in its set state with a signal from the pulser 2 which has detected a maximum ignition advanced position and a discharging circuit is formed of the output Q of the FF 4, the resistance 5, the capacitor 7 and the output of the op-amp 6 to initiate the discharging of the capacitor 7 with a predetermined constant current. That is, the discharge current $I_1$ results in $$I_1 = \frac{V_{OH} - V_2}{R_5}$$

where $V_{OH}$: Output voltage at its high level from RS FLIP-FLOP 4.

$R_5$: Magnitude of resistance of the resistance 5.

Then, when a signal detecting a minimum ignition advanced position is issued from the pulser 3, the FF 4 is inverted from its set state to its reset state to invert the output from the output $\bar{Q}$ of the FF 4 from its "L" level to its "H" level. Thus, an output is issued from the pulse circuit 8 as shown in FIG. 2(e).

The transistor 9 receives this output to cause the conduction thereof, causing the capacitor 7 to be short-circuited. This capacitor 7 is rapidly discharged and the output voltage from the op-amp 6 becomes a set voltage at the non-inverting input thereof, that is, the second voltage $V_2$. If the output signal from the pulse circuit 8 disappears, then the transistor 9 is cut off. Since the FF 4 has already been in its reset state, a charging circuit is formed which is the output of the op-amp 6, the capacitor 7, the resistance 5 and the output Q of the FF 4. The capacitor 7 is then charged with a predetermined constant current. That is, a charging current $I_2$ results in $$I_2 = \frac{V_2 - V_{OL}}{R_5}$$

where $V_{OL}$: output voltage at its low level from RS FLIP-FLOP 4.

Thereafter, the similar operation is repeated to depict a waveform as shown in FIG. 2(f) by the output voltage from the op-amp 6.

The comparator 10 compares the output voltage from said op-amp 6 with a first voltage $V_1$ to generate a signal at a time point when the discharge voltage on the capacitor 7 is equal to said first voltage $V_1$. Thereafter, it is operated so that a high voltage is generated on the secondary side of an ignition coil connected to a semiconductor switch (not shown).

At that time, assuming that the rotational speed of the engine is of N(RPM), and the spacing ratios of the maximum ignition advanced position and the minimum ignition advanced position are $K_1$ and $K_2$, and a period is T seconds, and the time interval from an ignition advance pulse position (FIG. 2(g)) to the minimum ignition advanced position is t seconds and the capacity of the capacitor 7 is C farads, then:

$$V_p = V_2 + \frac{I_2}{C} K_1 T \tag{A}$$

and $$V_p - V_1 = \frac{I_1}{C} (K_2 T - t) \tag{B}$$

results by using the peak voltage $V_p$ on the capacitor 7.

From these two expressions (A) and (B)

$$t = K_2 T - \frac{I_2}{I_1} K_1 T + \frac{C}{I_1} (V_1 - V_2) \tag{C}$$

results.

The conversion of this time interval of t seconds into an ignition advanced angle Θ results in $$\theta = 360° \cdot \frac{t}{T} \tag{D}$$

-continued $$= 360° \cdot \left( K_2 - \frac{I_2}{I_1} K_1 \right) + \frac{6C}{I_1} (V_1 - V_2) \cdot N$$

and it is understood that the ignition position advances rectilinearly in accordance with the rotational speed of the engine. When the rotational speed of the engine is smaller than a certain amounts, the voltage across the capacitor 7 becomes higher than $V_1$ at a time point where the discharge is completed and the ignition advance pulse is issued upon the rapid discharge. In short, the minimum ignition advanced position becomes the ignition position.

The rotational speed with which the ignition advance is initiated is when the voltage across the capacitor 7, at a time point where the discharge is complete, may equal to the first voltage $V_1$. This is be freely set by adjusting the first voltage $V_1$, the second voltage $V_2$, the capacity of the capacitor 7, the magnitude of the resistance 5, etc. Also, if the rotational speed of the engine is larger than a certain amount, then the peak $V_P$ of the voltage across the capacitor 7 at a time point where the charge is completed becomes less than $V_1$ and the ignition advance pulse from the comparator 10 is not obtained. In a region of this rotational speed, the maximum ignition advanced position from the pulser 2 makes an ignition position although it is not illustrated.

The rotational speed with which the ignition advance terminates is when $V_2 = V_1$. This can be freely set by adjusting the first voltage $V_1$, the second voltage $V_2$, the charging current $I_2$, the capacity of the capacitor 7, etc. Also, the minimum ignition advanced position and the maximum ignition advanced position can be freely set by changing the positions of the pulsers 2 and 3.

Since the conventional ignition apparatus is constructed as described above, it is possible to control the ignition advance so as to be proportional to the rotational speed of the engine, but it has not been possible to control the ignition advance in dependence upon the status of the engine, for example, a temperature or a vacuum in a manifold. Thus, there has been the disadvantage in that the ignition advance characteristic required for the engine is not sufficiently adjusted.

Also, as an apparatus of the type referred to, there has previously existed what is illustrated in Japanese laid-open patent application No. 96,365/1980. According to said well-known example, a first triangular wave generator means is required for generating a reference voltage rising with a predetermined tilted angle from an ignition position of a minimum ignition advance to an ignition position of a maximum ignition advance, and flat after the ignition advance and inversely proportional to the rotational speed of the engine, and a third triangular wave generator means is required for generating a voltage rising from the ignition position of the maximum ignition advance with a predetermined tilted angle according with to the status of the engine, and a second triangular wave generator means is required for setting an ignition advance, by generating a voltage rising from an intersection of the reference voltage inversely proportional to the rotational speed according to said first triangular wave generator means and said third triangular wave voltage. The first, second and third triangular wave generator means have respectively required separate integrating capacitors. Thus, the ignition advance characteristic includes capacities of the three capacitors in its variables so that there have been the disadvantages in that the initial adjustment of the ignition advance characteristic is complicated and the ignition advance characteristic is easily varied with ageing changes in the capacities of the capacitors. Furthermore, there have also been disadvantages in that the integrating capacitor may normally require a high capacity and the hybrid integration thereof is difficult, thereby limiting the possibility rendering the apparatus small sized and cheap.

Also, the ignition advanced angle has been able to be controlled by changing a tilted angle of the third triangular wave in accordance with the status of the engine without relying on the rotational speed of the engine. However, a rectilinearly proportional relationship does not exist between amounts of the changes in tilt of said triangular wave voltages and the controlled ignition advanced angle so that, for example, where an output signal from a vacuum sensor which has been rectilinarly changed in accordance with a vacuum in the engine so as to control the ignition advanced angle in proportion to a magnitude of the vacuum, there has been the disadvantage in that an interface circuit between the vacuum sensor and a circuit for controlling the tilt of the third triangular wave voltage is complicated.

SUMMARY OF THE INVENTION

The present invention has been made in order to remove said prior art disadvantages and has for its object to provide an ignition apparatus for an engine based on semiconductors and able to sufficiently satisfy the required ignition advance characteristic of the engine by detecting a third reference position for controlling a width of an ignition advance and changing this third reference position in accordance with the status of the engine.

Also, the present invention has been made in order to remove said prior art disadvantages and has for its object to provide an ignition apparatus for an internal combustion engine having the ignition advance characteristics among which the ignition advance characteristic according to the rotation of the engine is composed of an integration circuit using a single capacitor and the ignition advance characteristic according the status of the engine such as a vacuum therein can be provided by adding a constant angle pulse circuit using another single capacitor.

Furthermore, the present invention has for its object to provide an ignition apparatus for an internal combustion engine capable of controlling an ignition timing of circuitry ignition advance control means composed by using two integrating capacitors.

DESCRIPTION OF THE PREFERRED EMBODIMENT

Figure 3:
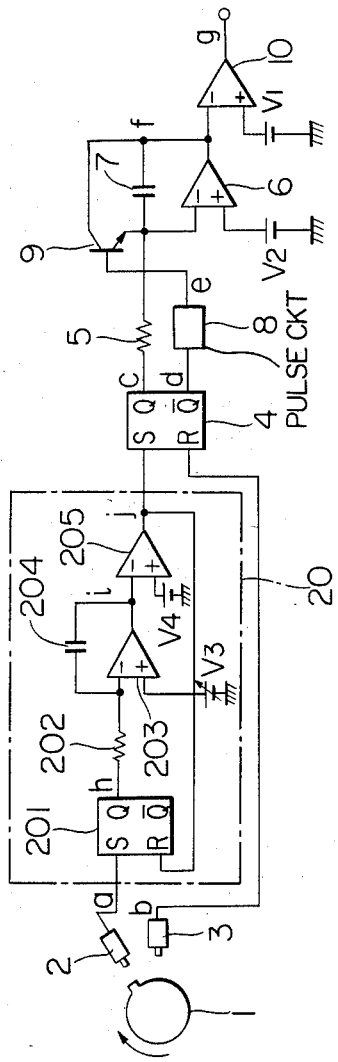
FIG. 3 is a circuit diagram of one embodiment of the ignition apparatus of the present invention.

Hereinafter with respect to embodiments of the ignition apparatus of the present invention, the description will be made on the basis of the drawings. FIG. 3 is a circuit diagram illustrating a construction of one embodiment thereof. In this, FIG. 3, the same reference numerals designate the components which are identical to those of FIG. 1, and their description is omitted.

Figure 1:
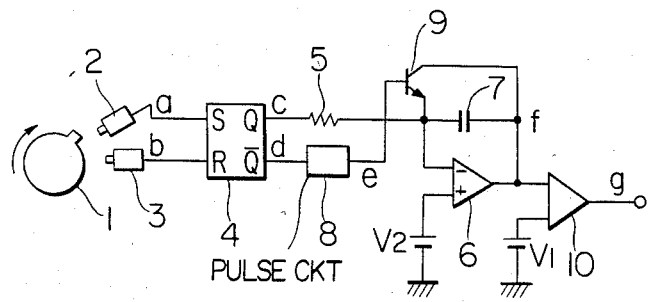
FIG. 1 is a circuit diagram illustrating a conventional ignition apparatus.

As apparent from the comparison of FIG. 3 with FIG. 1, FIG. 3 has a constant angle delay circuit 20 newly provided on the circuit of FIG. 1 and this constant angle delay circuit 20 has its angle width controlled by a voltage $V_3$ which is changed in accordance with the status of the engine, for example, a negative pressure in a manifold. It consists of a flip-flop FF 201 which is set with the output from the pulser 2 and which detects, from the output of the pulser 3 for detecting the minimum ignition advanced position, a second reference position which is advanced through an angle which is not less than the sum of a maximum magnitude of the angle width controlled by said constant angle delay circuit 20 and a maximum magnitude of an advanced angle width proportional to the rotational speed of the engine. A resistance 202 is connected between an output Q of the FF 201 and an inverting input of an op-amp 203. An integrating capacitor 204 is connected between an output and an inverting input of the op-amp 203, and a comparator 205 has an inverting input connected to the output of the op-amp 203. This comparator 205 has an output connected to both a resetting input of the FF 201 and a setting input of the FF 4.

Also inputted to a non-inverting input of the op-amp 204 is a voltage which is changed in accordance with a negative pressure in the manifold or a third voltage $V_3$. A non-inverting input of the comparator 205 is set to a fourth predetermined voltage $V_4$.

Figure 4:
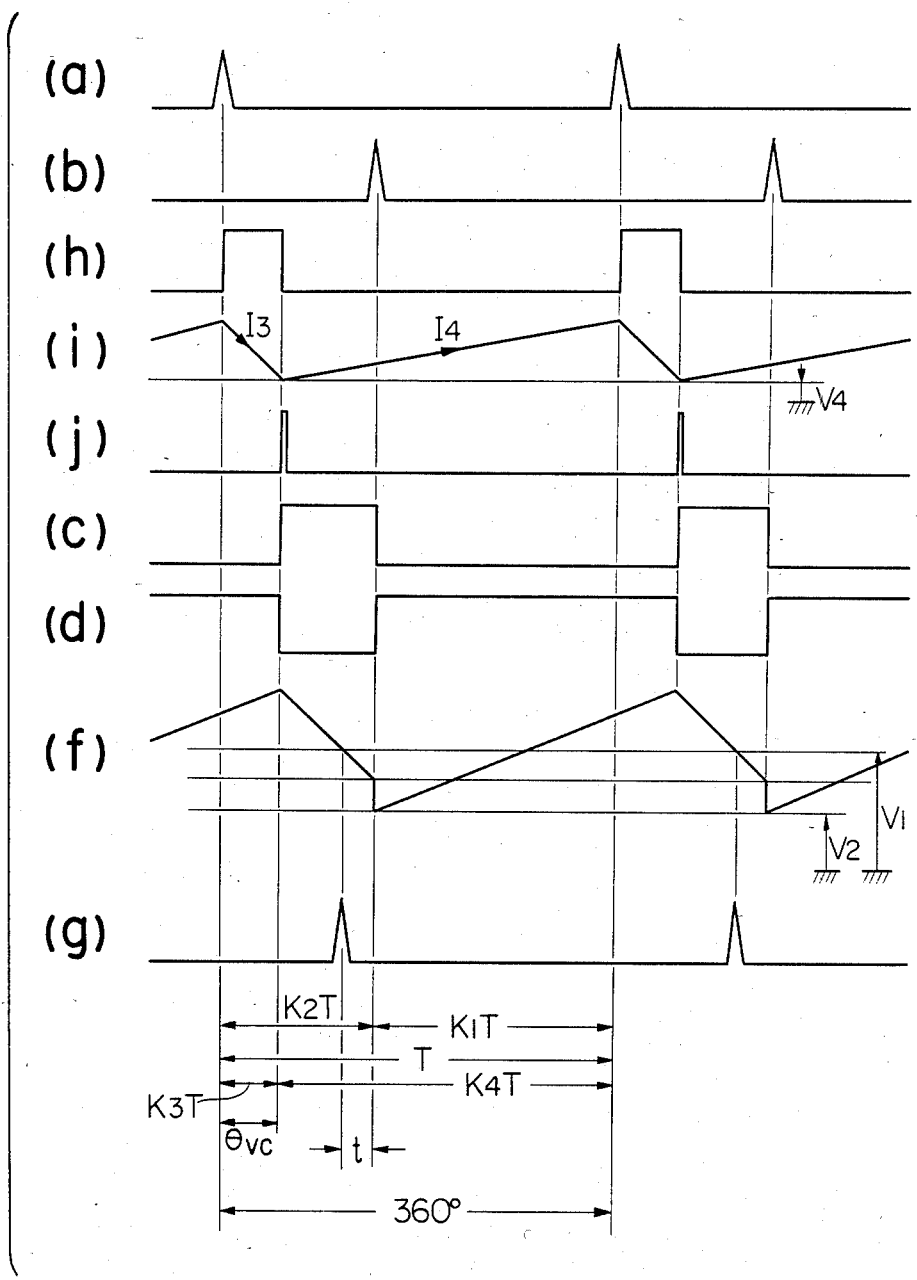
FIG. 4 (DIAGRAMS A-J) are of operating waveforms thereon.

Then, regarding the operation of the ignition apparatus of the present invention, the description will be made by jointly using timing charts of FIGS. 4(a) to 4(j), FIGS. 5(a) to 5(j) and FIGS. 6(a) to 6(g). Waveforms of FIGS. 4(a) to 4(j), FIGS. 5(a) to 5(j) and FIGS. 6(a) to 6(j) correspond to the waveforms on the portions of FIGS. 3(a) to 3(j). A signal as shown in FIG. 4(a) is outputted from the pulser 2 while an output as shown in FIG. 4(b) is outputted from the pulser 3 on the other hand. Here it is assumed that an angular difference between the pulser 2 and the pulser 3 is an angular difference which is not less than the sum of the maximum magnitude of a controlled width of the advanced angle proportional to the rotational speed of the engine and the maximum magnitude of the angle width controlled by the constant angle delay circuit 20.

The FF 201 is put in its set state by the output signal from the pulser 2 and its output Q thereof is substantially as shown in FIG. 4(h). At that time, there is formed a discharging circuit of the output Q of the FF 201—the resistance 202—the capacitor 204 and the output of the op-amp 203 so as to cause the capacitor 204 to discharge with a predetermined constant current. That is, a discharge current $I_3$ results in $$I_3 = \frac{V_{OH} - V_3}{R_{202}}$$

where $V_{OH}$: output voltage at its high level from RS FLIP-FLOP 201.

$R_{202}$: magnitude of resistance of resistance 202.

When a voltage at the output of the op-amp 203 becomes a set voltage at the non-inverting input of the comparator 205 or a fourth voltage $V_4$, said comparator 205 generates a comparison output as shown in FIG. 4(j).

Said FF 201 is inverted to its reset state with the output signal from this comparator 205 as shown in FIG. 4(h) to form a charging circuit of the output of the op-amp 203—the capacitor 204—the resistance 202 and the output Q of the FF 201. The capacitor 204 is caused to charge with a predetermined constant current. That is, a charge current $I_4$ results in $$I_4 = \frac{V_3 - V_{OL}}{R_{202}}$$

where

1 $V_{OL}$: output voltage at its low level from RS FLIP-FLOP 201.

Thereafter, the similar operation is repeated so that the output voltage from the op-amp 203 is substantially as shown in FIG. 4(i).

Assuming here that spacing ratios of the set and reset states of the FF 201 is of $K_3$ and $K_4$ and an angle width in the set state, is of $\theta_{VC}$, $$\frac{K_4}{K_3} = \frac{I_3}{I_4} = \frac{V_{OH} - V_3}{V_3 - V_{OL}} = \frac{360° - \theta_{VC}}{\theta_{VC}}$$

results.

That is, $$\theta_{VC} = \frac{V_3 - V_{OL}}{V_{OH} - V_d} \cdot 360°$$

results and $\theta_{VC}$ is a magnitude of a voltage at the non-inverting input of the op-amp 203, that is, a constant angle as determined by the third voltage $V_3$.

As in the conventional ignition apparatus excepting that the output signal from the comparator 205 is connected to the setting input end of the FF 4, it can here be rectilinearly advanced in accordance with the rotational speed of the engine and between the third reference position given by the output signal from said comparator 205 and the first reference position given by the pulser 3.

Figure 5:
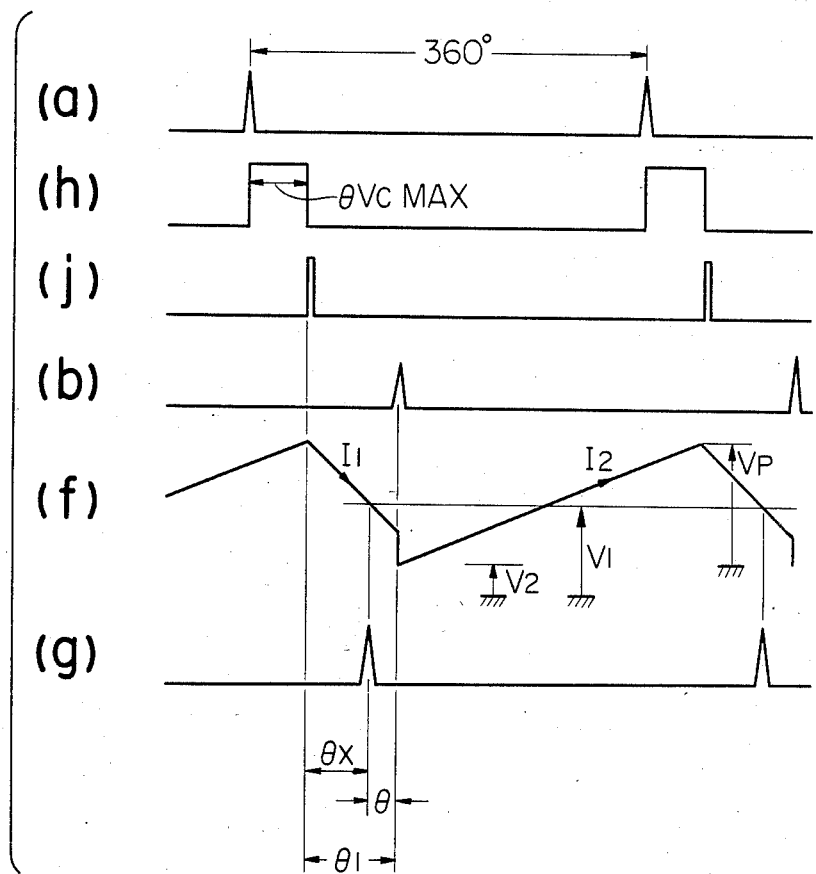
FIG. 5 (DIAGRAMS A-J) are of operating waveforms on one embodiment of the ignition apparatus of the present invention in the absence of an ignition advance according to the status of the engine.

That is to say, by setting the angle width $\theta_{VC}$ from the constant angle relay circuit 20 to a maximum magnitude as shown in FIG. 5, in the absence of an ignition advanced component due to the status of the engine, for example, the negative pressure in the manifold, an advanced angle $\theta$ of an ignition advance pulse obtained in FIG. 5(g) results in $$V_p = V_2 + \frac{I_2}{C} \cdot \frac{360° - \theta_1}{6N} \tag{E}$$

and $$V_p - V_1 = \frac{I_1}{C} \cdot \frac{\theta_x}{6N} \tag{F}$$

by using the peak voltage $V_p$ on the capacitor 7, on the assumption that as in the conventional ignition apparatus, the rotational speed of the engine is N(RPM), an angle between the output (j) from the comparator 205 and the output (b) from the pulser 3 is $\theta_1$ and an angle between the output (j) from the comparator 205 and the ignition advanced pulse (g) is $\theta_x$.

From said two expressions (E) and (F)

$$\theta = \theta_1 - \frac{I_2}{I_1}(360° - \theta_1) + \frac{6C}{I_1}(V_1 - V_2) \cdot N \tag{G}$$

results and the ignition position is rectilinearly advanced in accordance with the rotational speed of the engine.

When, in this circuit, the rotational speed of the engine is smaller than a certain amount, the voltage across the capacitor 7 at a time point where the discharge is completed becomes higher than the first voltage $V_1$ and the ignition advance pulse is issued upon the rapid discharge. In short, the minimum ignition advanced position becomes an ignition position. The rotational speed with which the ignition advance is initiated is when the voltage across the capacitor 7 at a time point where the discharge is completed is equal to the first voltage $V_1$. This can be freely set by adjusting the first voltage $V_1$, the second voltage $V_2$, the capacity of the capacitor 7, the magnitude of resistance of the resistance 5, etc.

Also, if the rotational speed of the engine is larger than the certain amount, then the peak $V_p$ of the voltage across the capacitor 7 at a time point where the charge is completed is less than the first voltage $V_1$ so as to be unable to provide the ignition advance pulse from the comparator 10. In the region of this amount, the ignition position is made of a time where the output signal is issued from the comparator 205, although it is not illustrated.

The rotational speed with which the ignition advance terminates is when $V_p = V_1$. This can be freely set by adjusting the first voltage $V_1$, the second voltage $V_2$, the charging current $I_2$, the capacity of the capacitor 7, etc. Also, the minimum and maximum ignition advanced positions can be freely set by changing the pulser 3 and a delayed angle from the constant angle delay circuit 20.

Figure 6:
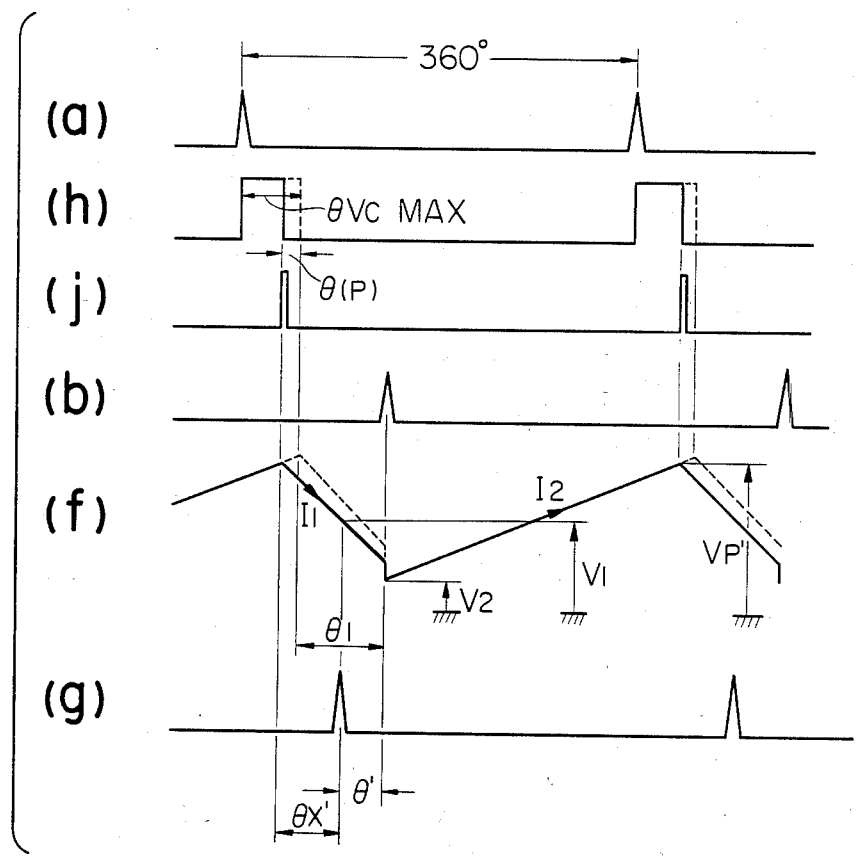
FIG. 6 (DIAGRAMS A-J) are of operating waveforms on one embodiment of the ignition apparatus of the present invention in the presence of an ignition advance of $\theta(p)$ according to the status of the engine.

Assuming that the delayed angle from the constant angle delay circuit 20 reduces by $\theta_{(p)}$, an advanced angle $\theta'$ of the ignition advance pulse provided in FIG. 6(g) becomes $$V_p = V_2 + \frac{I_2}{C} \cdot \frac{360° - (\theta_1 + \theta_{(p)})}{6N} \tag{H}$$

and $$V_p - V_1 = \frac{I_1}{C} \cdot \frac{\theta'_x}{6N} \tag{I}$$

by using the peak voltage $V'_p$ on the capacitor 7 on the assumption that the rotational speed of the engine is N(RPM) and an angle between the output j from the comparator 205 and the ignition advance pulse.

From said two expressions (H) and (I)

$$\theta' = \theta_1 + \theta_{(p)} - \theta'_x \tag{J}$$

$$= \theta_1 - \frac{I_2}{I_1}(360° - \theta_1) + \frac{6C}{I_1}(V_1 - V_2)N + \theta_{(p)} + \frac{I_2}{I_1}\theta_{(p)}$$

results. The ignition position is formed of an ignition advanced component rectilinearly advanced in accordance with the number of rotations of the engine, component $\theta_{(p)}$ by which the controlled angle width from the constant angle delay circuit 20 changes and an error component of the product of a ratio of the charging to the discharging current through the capacitor 7 and $\theta_{(p)}$.

Accordingly, the ignition advanced pulse or the ignition timing can be controlled independently of the rotational speed of the engine by changing the angle width from the constant angle delay circuit 20 in accordance with the status of the engine.

Here the error term of $$\frac{I_2}{I_1}\theta_{(p)}$$

can be put at a level causing no problem practically.

As described above and according to the ignition apparatus of the present invention, the construction is made so that there are provided means for detecting the first reference position making the ignition position of the minimum ignition advance, and means for detecting the second reference position advanced to or beyond the ignition position of the maximum ignition advance; a pulse delayed with a constant angle is generated from the second reference position and the third reference position is detected by controlling a pulse width from this constant angle delay circuit in accordance with the status of the engine whereby the ignition can be rectilinearly advanced between the third and first reference positions in accordance with the rotational speed of the engine. Thus, the ignition timing characteristic can be provided so as to be more optimum according to not only the rotational speed of the engine but also to a negative pressure, a temperature, etc.

Further, regarding another embodiment of the present invention, the description will be made by using FIGS. 7 and 8.

Figure 7:
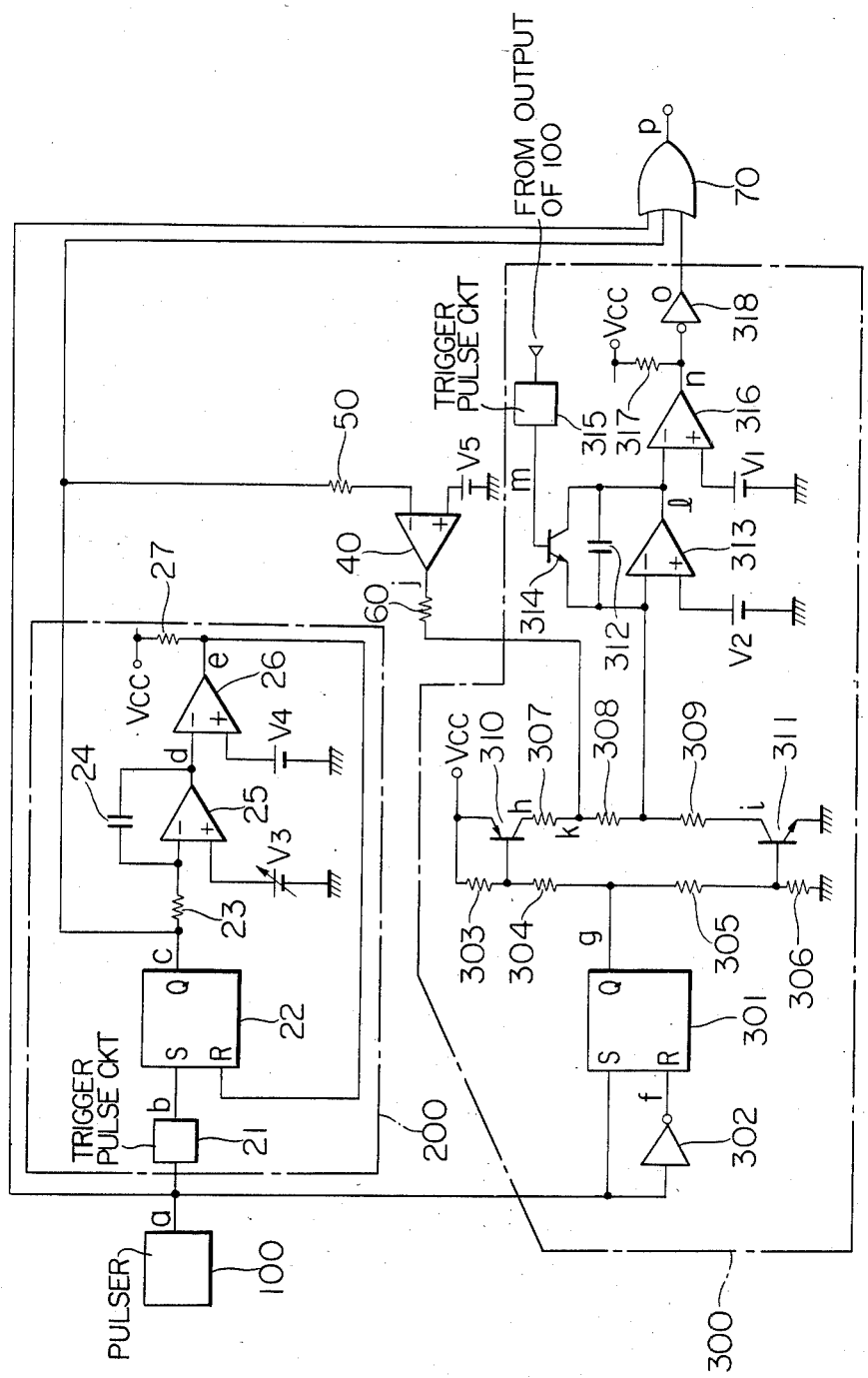
FIG. 7 is a circuit diagram illustrating another embodiment of the ignition apparatus of the present invention.

FIG. 7 is a circuit diagram illustrating one embodiment thereof. In FIG. 7, 100 is a pulser rotated in synchronism with the rotation of the engine so as to detect an ignition position of a maximum ignition advance and an ignition position of a minimum ignition advance.

Also, 200 is a pulse circuit for generating a constant angle pulse from a time point of the detection of the ignition position with the maximum ignition advance, and in accordance with the status of the engine such as a negative pressure; 21 is a trigger pulse circuit and 22 is a set-reset FLIP-FLOP (which is called hereafter a F.F.).

An output from the trigger pulse circuit 21 is supplied to a setting input S of the FF 22 and an output Q thereof is delivered to an inverting input of a comparator 40 of an open collector type through a resistance 40 and is also outputted to a second input of an OR circuit 70 (having three inputs) and furthermore it is connected to an inverting input of an operational amplifier (which is called hereinafter an OP amp) through a resistance 23.

An integrating capacitor 24 is connected between the output and inverting input of the OP amp 25 with a predetermined voltage $V_3$ imparted to a non-inverting input of this OP amp 25. The OP amp 25 thus forms an integrator.

An output of the OP amp 25 is connected to an inverting input of a comparator 26. A predetermined voltage $V_4$ is applied to a non-inverting input of the comparator 26. The comparator 26 compares this voltage $V_4$ with an output voltage from the OP amp 25 so as to generate a short pulse which is delivered to a resetting input R of the FF 22. An output of this comparator 26 is supplied via a resistance 27 to an electric source of a voltage $V_{cc}$ of which is caused to have a constant voltage. Thus, the pulse circuit 200 is composed of the trigger pulse circuit 21, the FF 22, the resistance 23, the capacitor 24, the OP amp 25, the comparator 26 and the resistance 27.

On the other hand, element 300 is an ignition advance pulse generator circuit for obtaining the ignition advance characteristic in accordance with the rotational speed of the engine from among its ignition advance characteristics. A setting input S of a FF 301 in this ignition advance pulse generator circuit 300 is connected to the pulser 100 and a resetting input R thereof is arranged to have inputted thereto a signal inverted from an output signal from the pulser 100 by an inverter 302.

An output Q of the FF 301 is connected to the junction of a resistance 304 and a resistance 305. Resistances 303 to 306 are serially connected between the electric source of the voltage $V_{cc}$ and ground, and the junction of the resistance 303 and 304 is connected to a base of a transistor 310. An emitter of the transistor 310 is connected to said electric source (the voltage $V_{cc}$).

Also the junction of the resistances 305 and 306 is connected to a base of a transistor 311. An emitter of the transistor 311 is grounded and resistances 307 to 309 are serially connected between collectors of both transistors 310 and 311. The junction of the resistances 307 and 308 is connected to the output of said comparator 40 through a resistance 60. Applied to a non-inverting input end of this comparator 40 is a predetermined voltage $V_5$ and this voltage $V_5$ is arranged to be compared with the output from the FF 22 by the comparator 40.

The junction of the resistances 308 and 309 is connected to an inverting input of an integrating OP amp 33. A predetermined voltage $V_2$ is applied to a non-inverting input of this OP amp 313. Also, an integrating capacitor 312 is connected between the inverting input and the output of the OP amp 313.

An emitter and a collector of a transistor 314 are connected across to this capacitor 312.

This transistor 314 is a transistor for rapidly discharging the capacitor 312 and a base of this transistor 314 is arranged to be applied with a trigger pulse signal of a sufficiently short time from a trigger pulse circuit 315. An input signal of the trigger pulse circuit 315 is inputted in synchronism with the detection of the ignition position of the minimum ignition advance by the pulser 100, whereby a trigger pulse is generated.

An output from the OP amp 313 is arranged to be sent to an inverting input of an inversion type comparator 316. The predetermined voltage $V_1$ is applied to an non-inverting input of the comparator 316. The comparator 316 is arranged to compare this voltage $V_1$ with the output from the OP amp 313 to output. The output of the comparator 316 is connected to the electric source of the voltage $V_{cc}$ through a resistance 317 while being connected to a third input of said OR circuit 70 through an inverter 318 for inverting the output thereof. The output from the pulser 100 is arranged to be inputted to a first input of the OR circuit 70.

Regarding the operation of the ignition apparatus of the present invention for the internal combustion engine constructed as described above, the description will then be made by jointly using FIGS. 8(a) to FIG. 8(p). Those FIGS. 8(a) to FIG. 8(p) illustrate signal waveforms at points a to p of FIG. 7, and FIG. 8(a) illustrates the output signal from the pulser 100 which signal is a rectangular wave signal having its output signal level changed from its high (which is called hereinafter "H") level to its low level (which is called hereinafter "L") at a maximum ignition advanced position $a_1$ and changed from its "L" to its "H" at a minimum ignition advance position $a_2$.

The trigger pulse circuit 21 receives the output signal from this pulser 100 to generate a differentiated trigger pulse synchronized with a fall of a waveform of FIG. 8(a) as shown in FIG. 8(b). The FF 22 is set with this differentiated trigger pulse to change an output signal level at the output Q thereof from its "L" to "H" as shown in FIG. 8(c).

An output from the output Q of this FF 22 is supplied to the inverting input of the OP amp 25 through a resistance 23. Thus, when the output from the output Q of said FF 22 is put at its "H" level, the capacitor 24 is initiated to discharge with a constant current $I_{d1}$ as shown in FIG. 2(d), Assuming that a magnitude of a voltage at the "H" level of the output at the output Q of the FF 22 is of $V_{OH}$ and a magnitude of resistance of the resistance 23 is of $R_{23}$, $$I_{d1} = \frac{V_{OH} - V_3}{R_{23}} \tag{1}$$

results.

Then when a magnitude of the output voltage from said OP amp 25 reaches the predetermined voltage $V_4$ by means of this discharge, the non-inverting input is set to the predetermined voltage $V_4$ to cause a comparator 26 whose inverting input is connected to the output of the OP amp 25 to output an inverted pulse. The output from this comparator 26 is changed from its "L" to its "H".

Also since the resetting input R of the FF 22 is connected to the output of the comparator 26. the FF 22 is immediately reset to change an output at an output Q thereof from its "H" to "L" as shown in FIG. 2(c). This results in the integrating capacitor 24 reversely charging with a constant current. A magnitude $I_{c1}$ of this constant current results in $$I_{c1} = \frac{V_3 - V_{OL}}{R_{23}} \quad (2)$$

assuming that a voltage at its L level vrom the FF 22 is of $V_{OL}$.

Thus, the output voltage from the comparator 26 changes immediately from its "H" to its "L" as shown in FIG. 8(e) resulting in a pulse whose pulse width is sufficiently short.

As is well known, an angle $\alpha°$ through which the output from the output Q of the FF 22 as shown in FIG. 8(c) is at its "H" level becomes a constant angle. Moreover, the angle $\alpha°$ changes in the rectilinearly proportional relationship with respect to a change in the predetermined voltage $V_3$.

Assuming hereinafter that a four cycle-four cylinder engine is considered and an angle of rotation of the engine corresponding to one ignition spacing is of 180°, this angular relationship is as follows:

$$\frac{I_{C1}}{I_{d1}} = \frac{V_3 - V_{OL}}{V_{OL} - V_3} = \frac{\alpha°}{180° - \alpha°}$$

Therefore $$\alpha° = \frac{V_3 - V_{OL}}{V_{OH} - V_{OL}} \cdot 180° \quad (3)$$

On the other hand, the output signal from the pulser 100 is inputted to the setting input S of the FF 301 and also a signal inverted from the output signal from the pulser 100 by the inverter 302 is inputted to the resetting input R of this FF 301. Thus, an output voltage waveform at the output Q of the FF 301 is substantially such as shown in FIG. 8(g). An output voltage from the inverter 302 is shown in FIG. 8(f).

Since the resistance 304 forming a base resistance for the transistor 310 is connected to the output Q of the FF 301, the transistor 310 is turned on when the FF 301 is at its "L" level and a collector voltage thereof is of $V_{cc} - V_{EC310}$ as shown in FIG. 8(h). Here $V_{cc}$ is a magnitude of the source voltage which is caused to be a constant voltage and $V_{EC310}$ shows a voltage drop across the emitter and collector of the transistor 310. When the output voltage from the output Q of the FF 301 is at its "H" level, the transistor 310 is in its OFF state.

On the other hand, since the resistance 305 forming a base resistance for the transistor 311 is connected to the output Q of the FF 301, this transistor 311 is turned on when a voltage from the output Q of the FF 301 is at its "H" level and a collector voltage thereof is put at its "L" level (which is assumed as $V_{CE311}$) as shown in FIG. 8(i). When the output voltage from the output Q of the FF 22 is at its "L" level, an OFF state is assumed.

Since the non-inverting input of the comparator 40 is set to a predetermined voltage $V_5$ between the voltage $V_{cc}$ and a GND level and since the inverting input is connected to the output of the FF 22 through a resistance 50, an "L" level (which is assumed as $V_{OL4}$) results as shown in FIG. 8(j) when the output from the output Q of the FF 22 is at its "H" level.

Also, the converter 40 is of an open collector type and when an output voltage level at the output Q of the FF 22 is at its "L" level, an output of this comparator 40 is non-conducting and results in an infinitely great resistance.

Here the collector of the transistor 310 is connected to an inverting input of an OP amp 313 through a series circuit of the resistances 307 and 308, the OP amp 313 forming an integration circuit having its non-inverting input set to the predetermined voltage $V_2$. Also the junction of the resistances 307 and 308 is connected to an output of the comparator 40 making an open collector through a resistance 60. Furthermore a collector resistance 309 for an NPN transistor 311 is connected to the inverting input of the OP amp 313.

Thus, as shown in FIG. 8(h), a collector voltage of the transistor 310 becomes a voltage of $V_{cc} - V_{EC310}$ when this transistor 310 is put in its ON state and becomes the predetermined voltage $V_2$ when it is put in its OFF state.

As shown in FIG. 8(i), a collector voltage of the transistor 311 becomes $V_{CE311}$ when this transistor 311 is put in its ON state and becomes the predetermined voltage $V_2$ when it is put in its OFF state.

As shown in FIG. 8(j), the output voltage from the comparator 40 becomes $V_{OL4}$ when the output voltage from the output Q of the FF 22 is at its "H" level and is identical to a potential at the junction of the resistances 307 and 308 shown in FIG. 8(k) when the output voltage from the output Q of the FF 22 is at its "L" level.

That is to say, when the output voltage from the output Q of the FF 22 is at its "L" level and also the transistor 310 is in its ON state, a voltage at the junction j results in $$(V_{cc} - V_{EB310} - V_2) \cdot \frac{R_{308}}{R_{308} + R_{307}} + V_2 \quad (4)$$

Here magnitudes of resistance of the resistance 307 and 308 are considered as $R_{307}$ and $R_{308}$ respectively.

Then, when the output voltage from the output Q of the FF 22 is at its "L" level and also the transistor 310 is put in its OFF state, the predetermined voltage $V_2$ results.

As shown in FIG. 8(k), a voltage at the junction of the resistances 307 and 308 becomes the predetermined voltage $V_2$ when the transistor 310 is put in its OFF state and also becomes $$(V_{cc} - V_{EC310} - V_2) \cdot \frac{R_{308}}{R_{308} + R_{307}} + V_2$$

when the transistor 310 is put in its OFF state and also the output voltage from the comparator 40 is not of $V_{OL4}$.

Then when the transistor 310 is in its ON state and also the output voltage from the comparator 4 is of $V_{OL4}$, a voltage at a point k is expressed by the following expression:

$$V_{cc} - V_{EC310} - R_{307} \cdot \left\{ \frac{V_{cc} - V_{EC310}}{R_{307} + \frac{R_{308} \cdot R_6}{R_{305} + R_6}} - \right. \quad (5)$$

$$\frac{V_2}{R_{308} + \frac{R_{307} \cdot R_6}{R_{307} + R_6}} \cdot \frac{R_6}{R_{307} + R_6} -$$

-continued $$\left. \frac{V_{OL4}}{R_6 + R_{307}||R_{308}} \cdot \frac{R_{308}}{R_{307} + R_{308}} \right\}$$

where $R_6$ is considered as a magnitude of resistance of the resistance 60.

The voltage expressed by the expression (5) can be the predetermined voltage $V_2$ by properly setting the magnitudes of the resistances $R_{307}$ and $R_6$. That is, assuming that $V_{OL4}=0$ and $R_{308}>R_{207}$, $R_{308}>R_6$ hold for purposes of simplification, the voltage at the point k results in $$V_{cc} - V_{EC310} - V_2 \cdot \frac{R_6}{R_6 + R_{307}} \quad (6)$$

Thus, it can be attained by holding $$\frac{R_6}{R_6 + R_{307}} = \frac{V_{cc} - V_{EC310} - V_2}{V_2} \quad (7)$$

By means of the above operation, a capacitor 312 connected between the inverting input and output ends of the integrating OP amp 313 has flowing therethrough a charging current with a constant current indicated by $$I_{c2} = \frac{V_2 - V_{CE311}}{R_{309}} \quad (8)$$

when the transistor 311 is in its ON state.

Then, when the transistor 310 is turned on and also an output voltage from the comparator 40 is at its "L" level, potentials at both ends of the resistance 308 are equal to each other and therefore the output voltage from the OP amp 313 is held without the capacitor 312 charging and discharging.

Then, if the output from the comparator 40 is not at its "L" level in the ON state of the transistor 310, then the capacitor 312 has flowing therethrough a discharging current with a constant current shown by $$I_{d2} = \frac{V_{cc} - V_{EC310} - V_2}{R_{307} + R_{308}} \quad (9)$$

Figure 8:
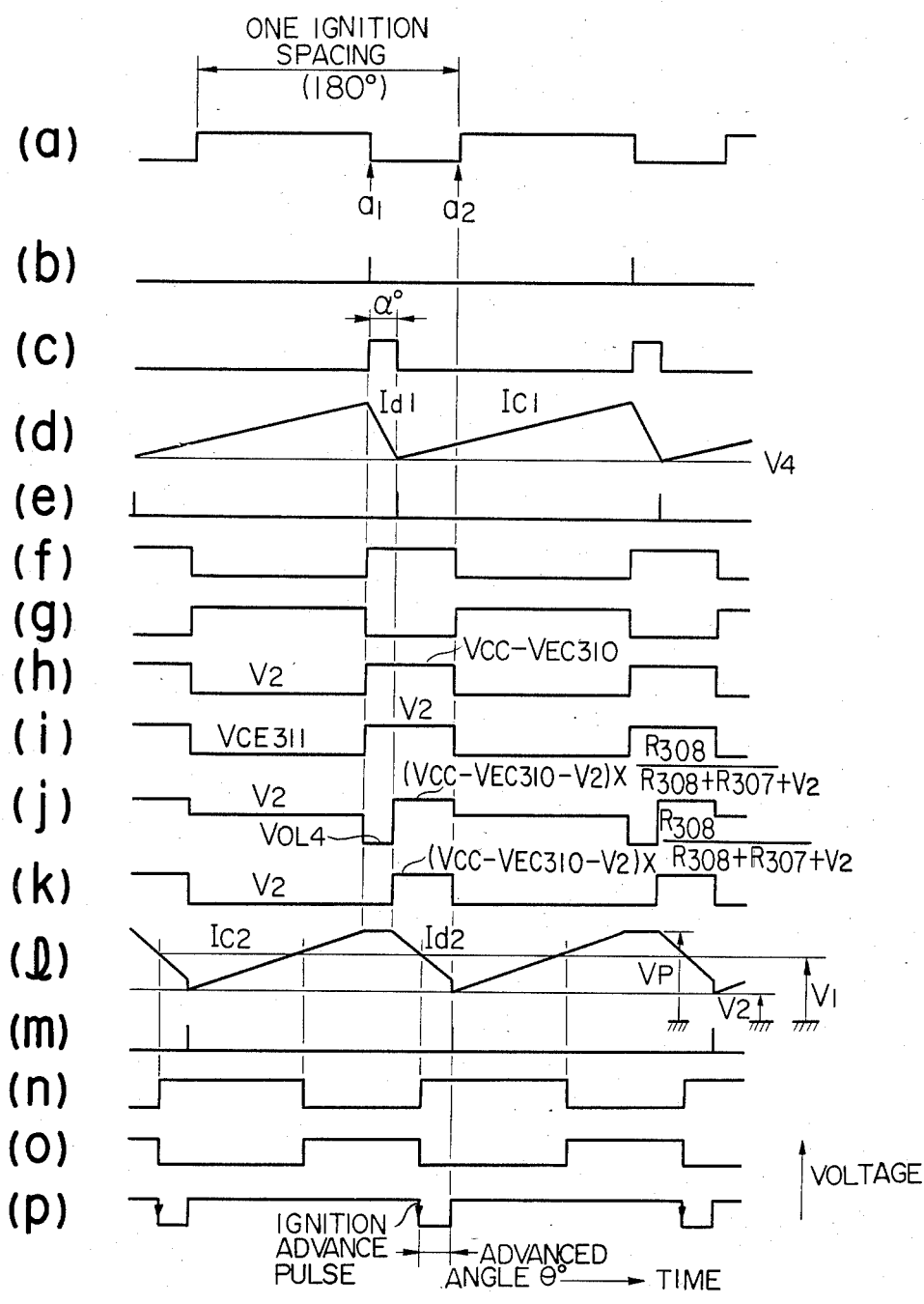
FIG. 8 (DIAGRAMS A-P) of operating waveforms on respective portions of the circuit of FIG. 7.

Also, the transistor 314 is turned on at a rise of the output signal from the pulser 100 or with an output signal (FIG. 8($m$)) from the trigger pulse circuit 315 for generating the differentiated trigger pulse in synchronism with the minimum ignition advanced position to rapidly discharge a charged electric charge on the capacitor 312. Thus, an output signal from the OP amp 313 is substantially such as shown in FIG. 8($l$).

The comparator 316 is an inversion type comparator for comparing the output signal from the OP amp 313 with the predetermined voltage $V_1$ to output an inverted pulse and on output signal voltage therefrom is substantially such as shown in FIG. 8($n$) and further inverted by an inverter 318 to generate an output signal of FIG. 8($o$).

An OR circuit 70 takes an OR of the output signal from the pulser 100, the output signal from the output Q of the FF 22 and the output signal from the inverter 318 to generate an output shown in FIG. 8($p$). Hereinafter an output signal from this OR circuit 70 is inputted to a semiconductor switch circuit not shown and operated to generate an ignition high voltage on an ignition coil which is interrupted and controlled by that semiconductor switch circuit and in synchronism with a fall of the output signal from the OR circuit 70.

Figure 2:
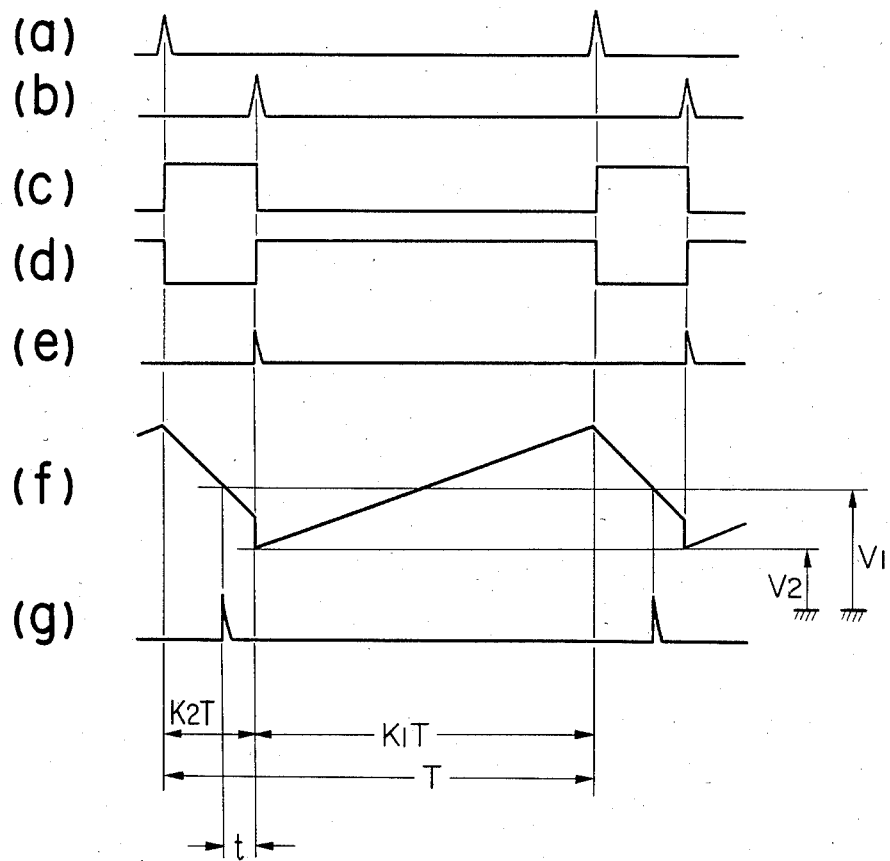
FIG. 2 (DIAGRAMS A-G) are of operating waveforms on the ignition apparatus of FIG. 1.

At that time, assuming that the rotational speed of the engine is of $N_{R.P.M}$, an angle between the minimum ignition advanced position and the minimum ignition advanced positions is of $\theta_m°$, a period is of T seconds, the peak of the output voltage from the OP amp 313 is of $V_p$, a capacity of the capacitor 312 is of C farads, a time interval of from the ignition advance pulse (a fall of FIG. 2($p$)) to the minimum ignition advanced position is of t seconds and an advanced angle of the ignition advance pulse is of $\theta°$, the following concerned expressions are obtained:

$$V_P = \frac{I_{c2}}{C} \cdot \frac{180° - \theta_M°}{180°} \cdot T + V_2 \quad (10)$$

and $$V_P - V_1 = \frac{I_{d2}}{C} \cdot \left( \frac{\theta_M°}{180°} T - t \right) \quad (11)$$

Solving the expressions (10) and (11) results in $$t = \frac{\theta_M° - \alpha°}{180°} T - \frac{I_{c2}}{I_{d2}} \cdot \left( \frac{180° - \theta_M}{180°} \right) \cdot T + \quad (12)$$

$$\frac{C}{I_{d2}} (V_1 - V_2)$$

By changing it to be the advanced angle $\theta°$, $$\theta = 180° \cdot \frac{t}{T} = (\theta°_M - \alpha°) - \frac{I_{c2}}{I_{d2}} (180 - \theta_M°) + \quad (13)$$

$$\frac{6c}{I_{d2}} (V_1 - V_2) \cdot N$$

results. The ignition advance pulse is expressed by a term rectilinearly advancing the ignition in accordance with the rotational speed of the engine, the pulse width $\alpha°$ from the constant angle delay circuit 200 variable in pulse width in the rectilinear relationship with respect to a change in predetermined voltage $V_3$ by changing this voltage $V_3$ in accordance with the status of the engine such as the vacuum and independently of the rotational speed of the engine, and a constant term.

That is to say, considering first an advanced angle component with fixing the pulse width $\alpha°$ of the contact angle from the constant angle pulse circuit 20, the voltage $V_c$ on the capacitor 312 at the time point where the discharge is completed becomes higher than the $V_1$ when rotational speed of the engine is smaller than a certain rotational speed, and the ignition advance pulse is issued upon the rapid discharge. In other words, the minimum ignition advanced position makes the ignition position. The rotational speed with which the ignition advance is initiated is when $V_c=V_1$ holds. This can be freely set by adjusting $V_1$ or $I_{d2}$ or the like.

Also if the rotational speed of the engine becomes larger than the certain rotational speed, then the voltage $V_P$ across the capacitor 312 at the time point when the charge is completed becomes lower than the $V_1$ so as to leave the output voltage from the comparator 316 at its "H" level as it is. Thus, the output signal from the inverter 318 which is inverted from the output signal from this comparator 316 is left at its "L" level as it is. The, ignition timing occurs at the fall of the constant angle pulse from the constant angle pulse circuit 200 or the fall of the output signal from the FF 22. The rotational speed with which the ignition advance dependent upon the rotation terminates is when $V_P = V_1$ holds. This can be freely set by adjusting the $V_2$ or the $I_{c2}$ or the like.

Then, if the voltage of $V_2$ is changed in accordance with the status of the engine such as the vacuum then the $\alpha°$ changes in the rectilinear relationship with respect to this change in $V_2$ so that the ignition advance pulse can be moved in parallel without depending upon the rotational speed.

After the ignition advance due to the rotational speed has terminated, the constant angle pulse $\alpha°$ can be advanced until 0° is reached. At that time, the maximum ignition advanced position becomes a maximum ignition advanced position as determined by the pulser 100.

While in said embodiment the description has been made in conjunction with a change in constant angle pulse width $\alpha°$ by means of the vacuum, the ignition timing can be also controlled by controlling the voltage $V_3$ by a knocking detector for detecting knocking of the engine to generate a signal voltage in accordance with the knocking.

As described above and according to the ignition apparatus of the present invention for the internal combustion engine, there is provided the pulser 100 for detecting the maximum and minimum ignition advanced positions, in synchronism with the rotation of the engine, the capacitor being arranged to charge between the minimum and maximum ignition advanced positions, the constant angle pulse being generated from the maximum ignition advanced position by the constant angle pulse circuit capable of changing an angle width in the rectilinear relationship with a predetermined voltage $V_3$ in accordance with the status of the engine, a voltage across said capacitor being held between these constant angle pulses, the discharge of said capacitor being initiated after the termination of said constant angle pulse, an ignition timing being made of a point where the voltage on that capacitor is equal to the predetermined voltage $V_1$, the voltage across said capacitor being rapidly discharged to the predetermined voltage $V_2$ at at least the position of the minimum advance the ignition timing being made of a time point where said constant angle pulse falls with the rotational speed which is not less than the rotational speed with which the voltage across the capacitor after the completion of the charge, is not higher than the $V_1$, and furthermore in the absence of the constant angle pulse, the ignition timing is made of the position of the maximum ignition advance as determined by the pulser. Thus, the ignition advance characteristic required for the engine can be obtain with one capacitor for calculating an ignition advance dependent upon the rotational speed and one capacitor for the constant angle pulse circuit and the apparatus can be rendered cheap and small-sized.

Also since the rectilinearly proportional relationship exists between a change in predetermined voltage $V_3$ and the pulse width $\alpha°$ of the constant angle pulse, there is the effect that the control is easily effected upon changing the ignition advanced angle with a magnitude of a voltage in accordance with the negative pressure of the engine and others without depending upon the number of rotations.

Furthermore, regarding another embodiment of the present invention, the description will be made by using FIGS. 9 to 13.

Figure 9:
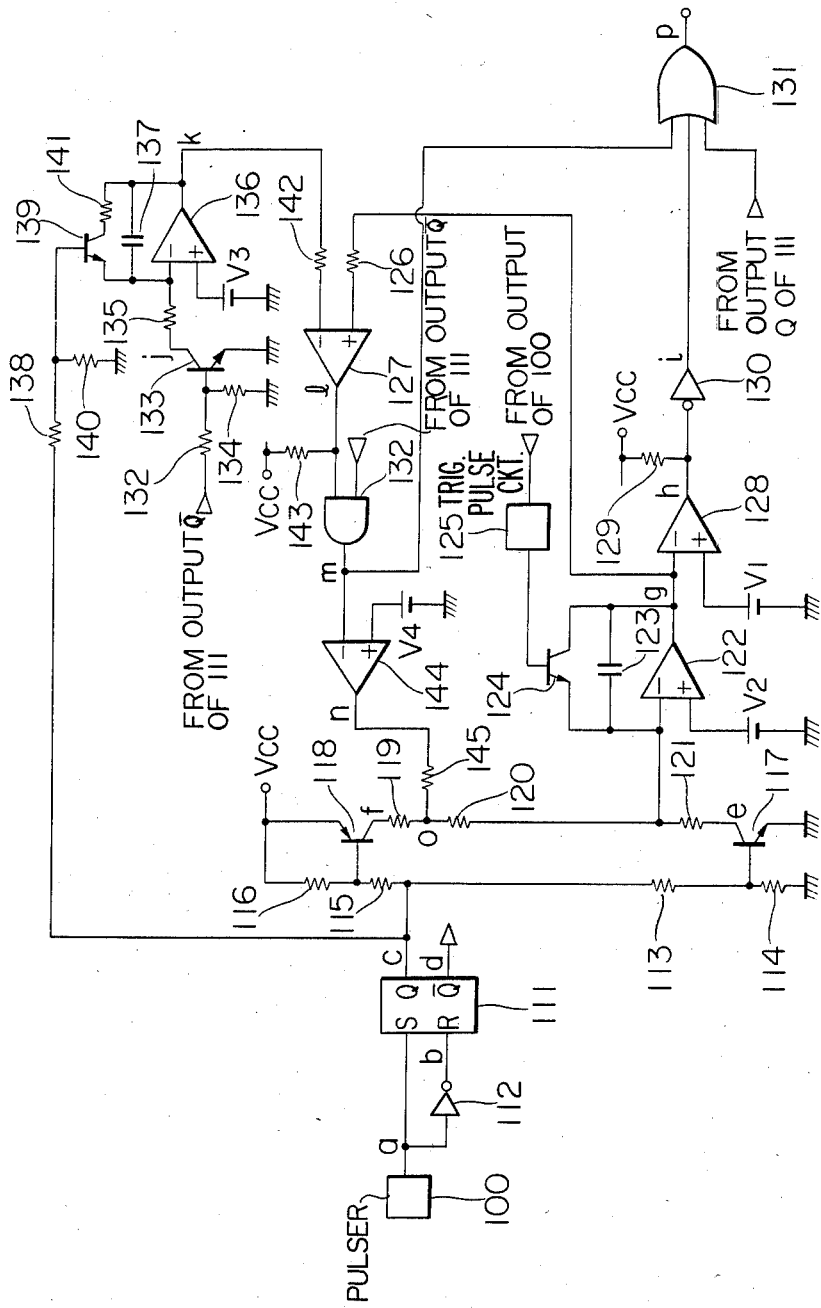
FIG. 9 is a circuit diagram illustrating another embodiment of the ignition apparatus of the present invention.

FIG. 9 is a circuit diagram illustrating a construction of one embodiment thereof and in this FIG. 9, 100 is a pulser for detecting a maximum ignition advanced position and a minimum ignition advanced position in synchronism with the rotation of the engine, and 111 is a set-reset FLIP-FLOP circuit (which is called hereinafter an FF) a setting input terminal of which is inputted with an output signal from the pulser 1 and a resetting input terminal of which is arranged to be inputted with a signal inverted from the output signal from the pulser 100 by an inverter 112.

Elements 113 to 116 are resistances. These resistances 113 to 116 are serially connected between ground and a source voltage $V_{cc}$ and the junction of the resistances 113 and 114 is connected to a base of an NPN type transistor 117.

Also connected to the junction of the resistances 113 and 115 is an output terminal Q of said FF 111. The junction of the resistances 115 and 116 is connected to a base of a PNP type transistor 118. An emitter of the transistor 118 is connected to an electric source $V_{cc}$. A collector of the transistor 118 is connected to a collector of the transistor 117 through resistances 119, 120 and 121. An emitter of the transistor 117 is grounded. The source voltage $V_{cc}$ is a constant voltage.

The junction of said resistances 120 and 121 is connected to an inverting input terminal of an operational amplifier (which is called hereinafter an OP amp) 122 forming an integrator. A non-inverting input terminal of this OP amp 122 is set to a second predetermined voltage $V_2$ and also an integrating capacitor 123 is connected between an inverting input terminal and an output terminal of the OP amp 122 while a collector and an emitter of a transistor 124 are connected thereto. The output signal from said pulser 100 is arranged to be supplied to a base of this transistor 124 through a trigger pulse circuit 125.

This trigger pulse circuit 125 receives the output signal from the pulser 100 to generate a differentiated trigger pulse upon the detection of the minimum ignition advanced position and the transistor 124 is arranged to be turned on for a short time interval with this trigger pulse to rapidly discharge an integrated voltage on the capacitor 123.

The output terminal of the OP amp 122 is connected to a non-inverting input terminal of a comparator 127 through a resistance 126 while being connected to an inverting input terminal of a comparator 128. A first predetermined voltage $V_1$ is set on a non-inverting input terminal of the comparator 128. The comparator 128 is arranged to compare the output voltage from the OP amp 122 with the voltage $V_1$ to output an inversion type comparision pulse. An output terminal of this comparator 128 is supplied with the source voltage $V_{cc}$ through a resistance 129 while being connected to a second input terminal of an OR circuit 131 through an inverter 130.

A first input terminal of the OR circuit 131 has inputted thereto an output from an AND circuit 132 and a third input terminal of the OR circuit 131 is connected to the output terminal Q of the FF 111.

On the other hand, the output terminal $\overline{Q}$ of said FF 2 is connected to a base of a transistor 133 through a resistance 132. The base of the transistor 133 is grounded through a resistance 134 and an emitter is also grounded. A collector of the transistor 133 is connected to an inverting input terminal of an integrating OP amp 136 through a resistance 135.

A third predetermined voltage $V_3$ is applied to a non-inverting input terminal of the OP amp 136. An integrating capacitor 137 is connected between an output terminal and an inverting input terminal of this OP amp 136. Also, the output terminal Q of said FF 111 is connected to a base of a transistor 139 through a resistance 138. The transistor 139 is to discharge the capacitor 137 and a base thereof is grounded through a resistance 140, an emitter being connected to the inverting input terminal of the OP amp 136 and a collector is connected to the output terminal of the OP amp 136 through a resistance 141.

The output terminal of the OP amp 136 is connected to the inverting input terminal of the comparator 127 through a resistance 142. The output terminal of the comparator 127 is connected to a first input terminal of the AND circuit 132 while being supplied with the source voltage $V_{cc}$ through a resistance 143.

A second input terminal of the AND circuit 132 is connected to an output terminal $\overline{Q}$ of the FF 111. As described above, the output terminal of this AND circuit 132 is connected to the first input terminal of the OR circuit 131 while being connected to an inverting input terminal of a comparator 144 of an open collector type. A fourth predetermined voltage $V_4$ is supplied to a non-inverting input terminal of the comparator 144. An output terminal of this comparator 144 is connected to the junction of resistances 119 and 120 through a resistance 145.

Furthermore, the output terminal of said OR circuit 131 is connected to a semiconductor switch not shown and this semiconductor switch is connected to an ignition coil for generating an ignition high voltage.

Figure 10:
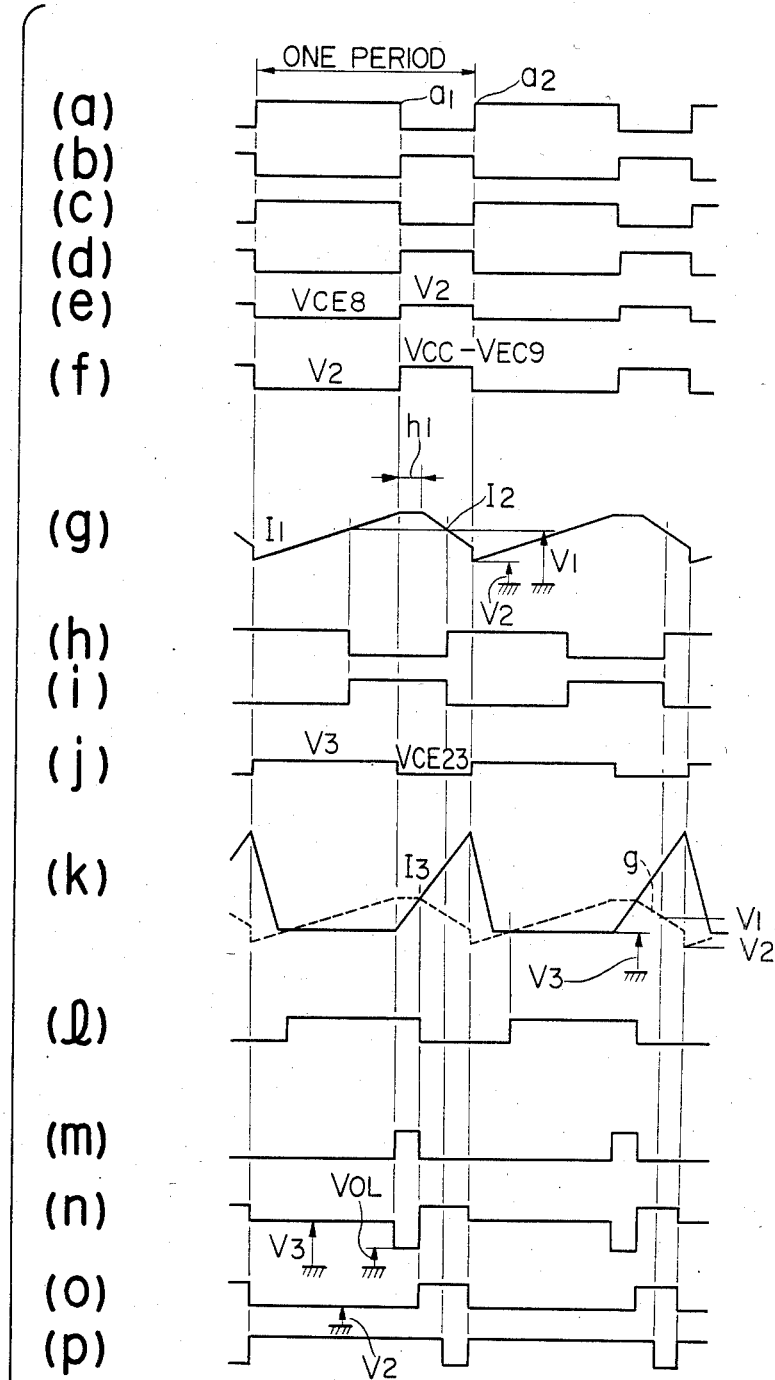
FIG. 10 (DIAGRAMS A-P) are of operating waveforms on the same ignition apparatus for an internal combustion engine.

Then, regarding the operation of the ignition apparatus constructed as described above of the present invention for an internal combusion engine, the description will be made with reference to FIG. 10 et seqq. FIG. 10 is a diagram of operating waveforms illustrating one embodiment of the present invention as shown in FIG. 9. FIG. 10(a) is a waveform of the output signal voltage from the pulser 100, the level of which changes from its high level (which is called hereinafter an H level) to its low level (which is called hereinafter an L level) upon the detection of a maximum ignition advanced position $a_1$ and changes from its "L" level to its "H" level upon the detection a minimum ignition advanced position $a_2$.

FIG. 10(b) is the output signal from the inverter 112 which is what is inverted from the signal voltage of FIG. 10(a).

It is assumed that the FF 111 is set with the output signal from the pulser 100 and reset with the output signal from the inverter 112 and that output signals from the output terminal Q and output terminal $\overline{Q}$ of this FF 111 are substantially such as shown in FIGS. 10(c) and (d) respectively.

Since the transistor 117 is turned on when the output signal from the output terminal Q of the FF 111 is at its "H" level and turned off when the output signal from this FF 111 is at its "L" level, a collector voltage thereof is substantially such as shown in FIG. 10(e). Here, $V_{CE8}$ is a collector-emitter voltage when the transistor 117 is in its ON state.

The transistor 118 is turned on when the output signal from the output terminal Q of the FF 111 is at its "L" level and turned off when the output signal from the output terminal Q of this FF 111 is at its "H" and therefore a collector voltage of the transistor 118 is what is shown in FIG. 10(f). That is, when the transistor 118 is in its ON state, a collector voltage thereof is of $V_{cc}-V_{CE9}$. Here, $V_{CE9}$ is an emitter to collector voltage of the transistor 118 when it is in its ON state.

Also, when the transistor 118 is in its OFF state, an output stage transistor of the comparator 114 of the open collector is in its OFF state through the operation as will be describe later and the output of that comparator 114 and the GND have an infinitely great resistance therebetween. Thus, the collector voltage of said transistor 118 becomes a voltage at the inverting input terminal of OP amp 122, or $V_2$.

The OP amp 122 forms an integration circuit with the capacitor 123 and an output signal therefrom is substantially as shown in in FIG. 10(g). That is to say, when the transistor 117 is in its ON state from the minimum ignition advanced position $a_2$ (FIG. 10(a)) to the maximum ignition advanced position $a_1$, the capacitor 123 is charged with a constant current $I_1$.

$$I_1 = \frac{V_2 - V_{CE8}}{R_{10}} \tag{14}$$

where $R_{10}$ is magnitude of resistance of the resistance 121.

Then, the transistor 118 is in its ON state from the maximum ignition advanced position $a_1$ to the minimum ignition advanced position $a_2$ and the capacitor 123 is discharged with a constant current $I_2$.

$$I_2 = \frac{V_{cc} - V_{CE9} - V_2}{R_{12} + R_{13}} \tag{15}$$

Here $R_{12}$ and $R_{13}$ are magnitudes of resistance of the resistances 119 and 120 respectively.

In this case, since the comparator 114 is in its ON state for a certain time period from the maximum ignition advanced position $a_1$ through the operation of the comparator 144 as will be described latter, the resistance 145 can be set so as to equal a voltage at the junction of the resistances 119 and 120 to the predetermined voltage $V_2$.

This results in the voltage across the capacitor 123 being held for a time period for which the comparator 144 is in its ON state. In FIG. 10(g) $h_1$ designates this held time period.

Also, the transistor 124 is turned on for a short time interval with the trigger pulse from the trigger pulse circuit 125 receiving the output signal from the pulser 100 to generate the differentiated trigger pulse and therefore an electric charge on the capacitor 123 is rapidly discharged. Thus a voltage at the output terminal of the OP amp 122 becomes the predetermined voltage $V_2$ imparted to the non-inverting input terminal of the OP amp 122 as shown in FIG. 10(g).

The comparator 128 compares the output signal from the OP amp 122 with the first predetermined voltage $V_1$ to generate a comparison pulse signal as shown in in FIG. 10(h). Then, as shown in FIG. 10(i), the output signal from the comparator 128 is inverted by the inverter 130 and inputted to the OR circuit 131.

On the other hand, since the transistor 133 is turned on when the output from the output terminal $\overline{Q}$ of the FF 111 is in its "H" level that is, between the maximum ignition advanced position a₁ and the minimum ignition advanced position a₂, a collector voltage of the transistor 133 is substantially as shown in FIG. 10(*j*). Here, when the transistor 133 is in its ON state, a collector-to-emitter voltage is assumed as $V_{CE23}$. When the transistor 133 is in its ON state, the capacitor 137 is charged with a constant current $I_3$.

$$I_3 = \frac{V_3 - V_{CE23}}{R_{25}} \quad (16)$$

Here it is assumed that a magnitude of resistance of the resistance 135 is of $R_{25}$.

On the other hand, the transistor 139 is turned on when the output at the output terminal Q of the FF 111 is at its "H" level, that is, between the minimum ignition advanced position a₂ and the maximum ignition advanced position a₁ to discharge an electric charge on the capacitor 137 with a predetermined time constant. Thus, an output signal voltage from the OP amp 136 is substantially as shown in FIG. 19(*k*).

The comparator 127 compares the output signal voltage from the OP amp 122 with the output signal voltage from the OP amp 136 to generate a comparison pulse as shown in FIG. 10(*l*). As shown in FIG. 10(*m*), and AND circuit 132 generates an AND pulse of the output signal from the camparator 127 and the output signal from the output terminal $\overline{Q}$ of the FF 111. An output signal from this AND circuit 132 is inputted to the OR circuit 131 and the comparator 144.

The comparator 144 becomes a open collector and compares a fourth predetermined voltage $V_4$ imparted to the non-inverting input terminal thereof with the output signal from the AND circuit 132 to output a signal as shown in FIG. 10(*n*). That is, by setting the fourth predetermined voltage $V_4$ to be less than a level at which the output signal from the AND circuit 132 is at its "H", level there is provided a signal inverted from the output signal from the AND circuit 132.

When the output signal from the AND circuit 132 is at its "H" level, the output signal from the comparator 144 becomes $V_{OL}$.

Here $V_{OL}$ designates the "L" level of this comparator 144.

When the output signal from the AND circuit 132 is at its "L" level, the comparator 144 becomes an open collector. Thus, the output signal from the comparator 144 becomes the second predetermined voltage $V_2$ from the minimum ignition advanced position a₁ to the maximum ignition advanced position a₁. Between the maximum ignition advanced position a₁ and the minimum ignition advanced position a₂ and moreover for a time period excepting that the output signal from the AND circuit 132 is at its "H" level, the output signal voltage from the comparator 144 is equal to a voltage at the junction of the resistances 119 and 120.

That is $$\frac{R_{12}}{R_{12} + R_{13}} (V_{cc} - V_{EC9} - V_2) + V_2 \quad (17)$$

results.

Here it is assumed that magnitudes of resistance of resistances 119 and 120 are of $R_{12}$ and $R_{13}$ respectively.

The voltage at the junction of said resistance 119 and the resistance 120 is substantially as shown in FIG. 10(*o*). That is to say, it is equal to the predetermined voltage $V_2$ between the minimum ignition advanced position a₂ and the maximum ignition advanced position a₁ and also it becomes the magnitude as shown in said expression (17) between the maximum ignition advanced position a₁ and the minimum ignition advanced position a₂ and also for the time period exception that the output signal from the AND circuit 132 is at its "H" level.

Also, for a time period for which the output signal from said AND circuit 132 is at its "H" level, that is, for a time period for which the output signal from the comprator 144 is at $V_{OL}$, it can be equal to the second predetermined voltage $V_2$ by properly setting magnitudes of the resistance 119 and a resistance 145. Thus, the voltage across the capacitor 123 is held as shown in FIG. 10(*g*) between the maximum ignition advanced position and a time point where the OP amp 122 is equal in output signal voltage to the OP amp 136.

Since the OR circuit 131 has inputted thereto the output signal from the output terminal Q of the FF 111, the output signal from the inverter 130 and the output signal from the AND circuit 132, there is provided an output signal as shown in FIG. 10(*p*) at the output of the OR circuit 131. Thereafter, the output of the OR circuit 131 is connected to a semiconductor switch not shown and operated to generate an ignition high voltage on the secondary side of an ignition coil in synchronism with the fall of the output signal voltage from the OR circuit 131, which coil has a winding on the primary side thereof which is interrupted and controlled by this semiconductor switch.

Figure 11:
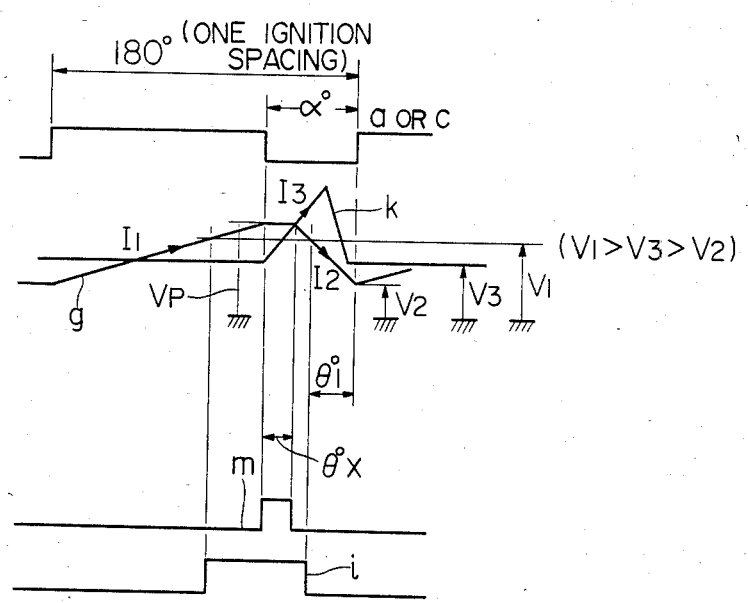
FIG. 11 is a diagram illustrating one portion of the operating waveform diagrams of FIG. 10 in order to explain the ignition advanced angle on the same ignition apparatus for the internal combustion engine.
Figure 12:
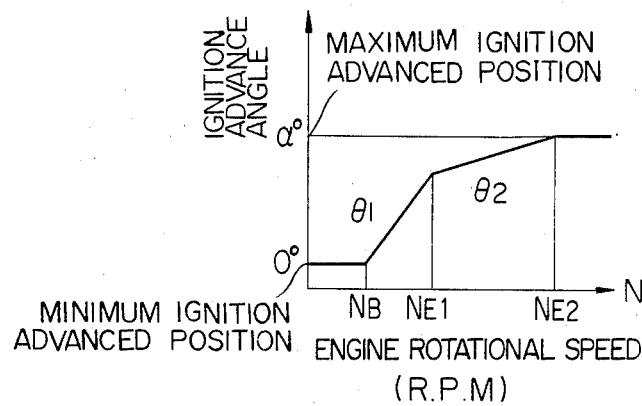
FIG. 12 is a diagram of the ignition advance characteristic provided by the same ignition apparatus for the internal combustion engine.

Then regarding an ignition timing, the detailed description will be made by using FIG. 11 and FIG. 12. FIG. 11 shows one part of the operating waveforms illustrated in FIG. 10. FIG. 12 shows the ignition advance angle characteristic relative to the rotational speed of the engine obtained by one embodiment of the present inventin.

Assuming that, as the engine, a four cycle-four cylinder engine is considered, the component of the output signal from the pulse 100 for one period corresponds to 180° of angle of rotation of the engine and is also equivalent to the one ignition spacing. It assumed that an angle of rotation of the engine of from the minimum ignition advanced position to the maximum ignition advanced position is of α° as shown in FIG. 11, an angle of rotation of the engine corresponding to a pulse width of the output signal from the AND circuit 132 is of $\theta_x°$, an angle of rotation of from the minimum ignition advanced position to a time point where the output signal from the OP amp 122 is equal to the first predetermined voltage $V_1$ during the discharge of the capacitor 123 is of $\theta_1°$ and the rotational speed of the engine is of $N_{PPM}$.

First $\theta_x$ is obtained. Assuming that a voltage at a point g at the maximum ignition advanced position is of $V_P$ and a voltage at a point k being charged with the constant current $I_3$ is of $V_c$, $$V_p = \frac{I_1}{C_{14}} \cdot \frac{180° - \alpha°}{6N} + V_2 \quad (18)$$

and $$V_c = \frac{I_3}{C_{26}} \cdot \frac{\theta_x°}{6N} + V_3 \quad (19)$$

result respectively,

Here it is assumed that capacities of the capacitors 123 and 137 are $C_{14}$ and $C_{26}$ farads respectively.

From $V_P = V_c$ here, $\theta_x°$ results in $$\theta_x° = \frac{C_{26}}{C_{14}} \cdot \frac{I_1}{I_3} (180° - \alpha°) - \frac{6C_{26}}{I_3} (V_3 - V_2) \cdot N \quad (20)$$

Then, obtaining $\theta_1$ results in $$V_P - V_1 = \frac{I_2}{C_{14}} \cdot \frac{\alpha° - \theta_x° - \theta_1°}{6N} \quad (21)$$

Thus, solving simultaneously this and the expression (18) results in $$\theta_1° = \alpha° - \theta_x° - \frac{I_1}{I_2}(180° - \alpha°) + \frac{6C_{14}}{I_2}(V_1 - V_2) \cdot N \quad (22)$$

By substituting this expression (20) into the expression (22), $$\theta_1° = \alpha° - \frac{C_{26}}{C_{14}} \cdot \frac{I_1}{I_3}(180° - \alpha°) - \frac{I_1}{I_2}(180° - \alpha°) + \frac{6C_{14}}{I_2}(V_1 - V_2) \cdot N + \frac{6C_{26}}{I_3}(V_3 - V_2) \cdot N \quad (23)$$

results.

From the above concerned expressions the ignition timing is as will be subsequently described. First when the rotational speed of the engine is less than the rotational speed shown by $N_B$ in FIG. 12, the voltage on the capacitor 123 at the time point where the discharge is completed becomes higher than the first predetermined voltage $V_1$ and the output signal voltage from the OR circuit 131 falls during the rapid discharge at the minimum ignition position. In other words, the minimum ignition position becomes the ignition timing. The rotational speed $N_B$ with which the ignition advance is initiated is when $\theta_1° = 0$ in the expression (23), and $$N_B = \frac{\alpha° - \frac{C_{26}}{C_{14}} \cdot \frac{I_1}{I_3}(180° - \alpha°) - \frac{I_1}{I_2}(180° - \alpha°)}{\frac{6C_{14}}{I_2}(V_1 - V_2) + \frac{6C_{26}}{I_3}(V_3 - V_2)} \quad (24)$$

results.

An advanced angle, until the rotational speed of the engine reaches the $N_{E1}$ in FIG. 12, become $\theta_1°$ as shown in the expression (23). Upon this rotational speed $N_{E1}$ being reached, the voltage on the capacitor 123 up to the time point where the charge is completed is equal to the voltage $V_1$ and from the expression (18) $N_{E1}$ results in $$N_{E1} = \frac{I_1}{6C_{14}(V_1 - V_2)}(180° - \alpha°) \quad (25)$$

Upon the rotational speed of the engine exceeding said $N_{E1}$, the voltage $V_P$ on the capacitor 123 at the time point where the charge is completed is less than the voltage $V_1$ and the output signal from the inverter 130 remains at its "L" level as it is. Thus when the output signal voltage from the AND circuit 132 falls, the signal voltage from the OR circuit 131 falls. In other words, $$\theta_2° = \alpha° - \theta° \quad (26)$$

results, assuming that an ignition advanced angle in a region of this rotational speed is of $\theta_2°$. Thus, $$\theta_2° = \alpha° - \frac{C_{26}}{C_{14}} \cdot \frac{I_1}{I_3}(180° - \alpha°) + \frac{6C_{26}}{I_3}(V_3 - V_2) \cdot N \quad (27)$$

results.

Then, when the rotational speed of the engine becomes the rotational speed as shown by $N_{E2}$ in FIG. 12, the voltage $V_P$ on the capacitor 123 at the time point where the charge is completed is equal to the voltage $V_3$ and from the expression (18) $N_{E2}$ $$N_{E2} = \frac{I_1}{6C_{14}(V_3 - V_2)}(180° - \alpha°) \quad (28)$$

results.

Upon the rotational speed of the engine exceeding said $N_{E2}$, the output signals not only from the inverter 130 but also from the AND circuit 132 are at their "L" level as intact and when the output signal voltage from the output terminal Q of the FF 111 falls, the output signal voltage from the OR circuit 131 falls. In other words, the maximum ignition advanced position become an ignition timing. That is, the ignition advanced angle is of $\alpha°$.

In the above-mentioned way the ignition timing has the ignition advance characteristic such as shown in FIG. 12.

Figure 13:
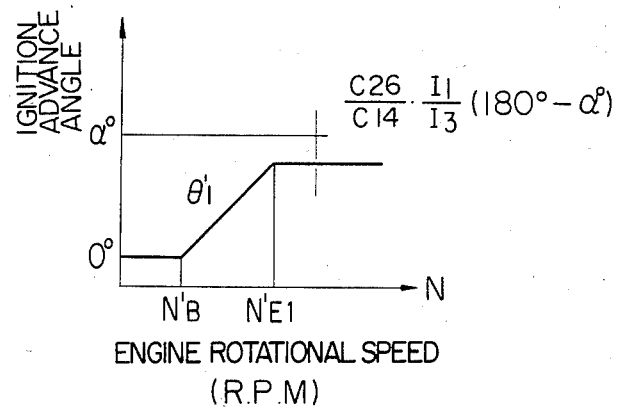
FIG. 13 is a diagram of the ignition advance characteristic provided by a separate embodiment of the ignition apparatus of the present invention for an internal combustion engine.

Furthermore, it has been assumed in the said embodiment that $V_1 > V_3 > V_2$ holds but assuming that $V_1 > V_3 = V_2$ holds, the ignition advance characteristic is obtained as shown in FIG. 13. In FIG. 13, the number of rotations $N'_B$ with which the ignition advance is initiated results in $$N'_B = \frac{\alpha° - \frac{C_{26}}{C_{14}} \cdot \frac{I_1}{I_3}(180° - \alpha°) - \frac{I_1}{I_2}(180° - \alpha°)}{\frac{6C_{14}}{I_2}(V_1 - V_2)} \quad (29)$$

by substituting $V_3 = V_2$ into the expression (24). Assuming that an ignition advanced angle after the initiation of the ignition advance is of $\theta°_1$, $$\theta'_1 = \alpha° - \frac{C_{26}}{C_{14}} \cdot \frac{I_1}{I_3}(180° - \alpha°) - \frac{I_1}{I_2}(180° - \alpha°) + \frac{6C_{14}}{I_2}(V_1 - V_2) \cdot N \quad (30)$$

results from the expression (23).

Aslo the number of rotations $N'_{E1}$ with which the ignition advance terminates is the same as $N_{E1}$ shown by the expression (25). Also an ignition advanced angle at that time results in $\alpha° - \theta_x°$ that is, in $$\alpha° - \frac{C_{26}}{C_{14}} \cdot \frac{I_1}{I_3}(180° - \alpha°)$$

because, substituting $V_3 = V_2$ into the expression (20) results in $$\theta_x° = \frac{C_{26}}{C_{14}} \cdot \frac{I_1}{I_3} (180° - \alpha°) \tag{31}$$

from which $\theta_x°$ becomes a constant angle.

As described above, and according to the ignition apparatus of the present invention for an internal combustion engine, it is arranged to obtain the ignition advanced angle by means of an electronic circuit composed of two integrating capacitors. Thus there is the effect that the adjustment of the ignition advance characteristic is simple, and a variation in the ignition advance characteristic relative to changes in capacities of the capacitors due to their aging becomes small while it can contribute to rendering the apparatus small-sized and cheap.

The present invention can be utilized to control the ignition timing of an engine used with a vehicle.

I claim:

1. An ignition apparatus for an internal combustion engine consisting of means for detecting an ignition position of a minimum ignition advance of an internal combustion engine, first detection means for detecting an ignition position of a maximum ignition advance of said internal combustion engine, a first circuit for charging a first capacitor between the detection of the ignition position of the minimum ignition advance and the detection of the ignition position of the maximum ignition advance, a second circuit for charging a second capacitor between the detection of the ignition position of the maximum ignition advance of said internal combustion engine and at latest the detection of the ignition position of the minimum igntion advance, a third circuit for discharging a voltage on said second capacitor to a third predetermined voltage $V_3$ till at latest a maximum ignition advanced position after one period is detected, second detection means for detecting a time point where a voltage on said first capacitor at the ignition position of the maximum ignition advance of said internal combustion engine is equal to the voltage on said second capacitor, holding means for holding the voltage on the first capacitor from a time point where the ignition position of the maximum ignition advance is detected to the time point where the voltages on said first and second capacitors are equal to each other, a fourth circuit for discharging said first capacitor after the termination of this holding time period till at latest a time point where the ignition position of the minimum ignition advance is detected, a fifth circuit for rapidly discharging the voltage on said first capacitor to a second predetermined voltage $V_2$ at latest upon detecting the ignition position of the minimum ignition advance, third detection means for detecting a time point where the voltage on said first capacitor is equal to a first predetermined voltage $V_1$, and means for advancing the ignition position, in succession, from a minimum ignition advanced position through the time point where the voltage on said first capacitor is equal to the first predetermined voltage $V_1$, the time point where the voltage on the first capacitor is equal to the voltage on the second capacitor and to the maximum ignition advanced position in accordance with a rise of the number of rotations of the engine.

2. An ignition apparatus for an internal combustion engine as claimed in claim 1 characterized in that the first predetermined voltage $V_1$, the second predetermined voltage $V_2$ and the third predetermined voltages $V_3$ are put in the relationship of $V_1 > V_3 > V_2$.

3. An ignition apparatus for an internal combustion engine as claimed in claim 1 characterized in that the first predetermined voltage $V_1$, the second predetermined voltage $V_2$ and the third predetermined voltage $V_3$ are put in the relationship of $V_1 > V_2 = V_3$.

* * * * *